United States Patent [19]
Khaimov et al.

[11] 3,816,775
[45] June 11, 1974

[54] ELECTROMECHANICAL CONVERTER OF FLEXURAL VIBRATIONS

[76] Inventors: Mikhail Rashidovich Khaimov, Belovezhskaya ulitsa, 13, kv. 69, Moscow; Evgeny Mikhailovich Kheifets, ulitsa Gogolya, 17, kv. 7, Riga, both of U.S.S.R.

[22] Filed: Oct. 7, 1969

[21] Appl. No.: 864,502

[52] U.S. Cl............. 310/9.6, 310/8.2, 310/8.3, 179/110 A
[51] Int. Cl............................................. H04r 17/00
[58] Field of Search........... 310/8.2, 8.3, 9.1, 9.4, 310/9.6; 340/10; 179/110 A, 100.41 P

[56] References Cited
UNITED STATES PATENTS

| 3,166,730 | 1/1965 | Brown, Jr. et al. | 310/9.6 X |
| 3,198,970 | 8/1965 | Kritz | 310/9.6 X |
| 3,209,176 | 9/1965 | Paley | 310/8.2 |
| 3,363,118 | 1/1968 | Sims | 310/9.6 X |
| 3,370,187 | 2/1968 | Straube | 310/9.6 X |

*Primary Examiner*—J. D. Miller
*Assistant Examiner*—Mark O. Budd
*Attorney, Agent, or Firm*—Holman & Stern

[57] ABSTRACT

An electromechanical converter of flexural vibrations used, for example, in electromechanical filters in the field of radio engineering, comprising a disk-shaped resonating element and a transducer element for converting electrical vibrations into mechanical and mechanical vibrations into electrical, wherein said converter features increased stability to the effect of mechanical loads and is easily tuned to the desired frequency. The transducer element takes the form of a ring of piezoelectric material disposed on the periphery of the disc engaging asymmetrically with respect to a central plane of the disc which is transverse to the axis thereof. A manipulation of the extent of asymmetry and the axial dimension of the ring provides an optimal arrangement and a control on the parameters of the converter.

2 Claims, 5 Drawing Figures

PATENTED JUN 11 1974 3,816,775

ELECTROMECHANICAL CONVERTER OF FLEXURAL VIBRATIONS

The electromechanical converter of the present invention pertains to the field of applied electroacoustics and can be particularly used in electromechanical filters which find extensive applications in radio engineering.

A typical known converter of flexural vibrations is used, for example, in disk-type electromechanical filters which comprise a resonating disk to the plane surface of which a periodically varying mechanical force is applied. An element converting electrical vibrations to mechanical and mechanical vibrations to electrical comprises a round rod of magnetostrictive material soldered or glued to the resonating disk of the converter and located in the fields of an exciting coil and of a polarizing magnet.

This known electromechanical converter suffers from the following serious disadvantages:

it is cumbersome due to the presence of a permanent magnet and an exciting coil;

it is not sufficiently resistant to the effects of mechanical loads;

the adjustment of the converter is time-consuming and requires a high degree of skill;

it does not exclude parasitic forms of vibrations with nodal diameters, since this converter belongs to the converter class with point-type excitation from the point of view of its principle of operation.

Also in the art are other converters wherein the construction does not lend itself to an effective control of the converter parameters.

It is an object of the present invention to eliminate these disadvantages.

It is a particular object of the present invention to provide an electromechanical converter of flexural vibrations without a permanent magnet or an exciting coil, which features an increased stability to the effects of mechanical loads and which is particularly easily tuned to the desired frequency.

This object is achieved in an electromechanical converter of flexural vibrations, comprising a disk-shaped resonating element and an element for converting electrical vibrations to mechanical and mechanical vibration to electrical vibrations, wherein, according to the present invention, the latter element is fashioned as a ring of piezoelectric material with electrodes applied onto its plane surfaces, said ring being disposed on the cylindrical surface of the disk-shaped resonating element asymmetrically relative to its central transverse plane and is attached to said cylindrical surface of said resonating element. The ring positioned asymmetrically relative to the central transverse plane of the resonating disk can also be traversed by said plane.

The invention will be better understood from the following detailed description of an electromechanical converter of flexural vibrations with due reference to the appended drawings, in which.

Figure 1A:
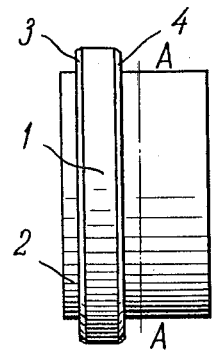
FIGS. 1a and 1b are respectively side and ends views showing a general representation of a preferred electromechanical converter according to this invention.
Figure 1B:
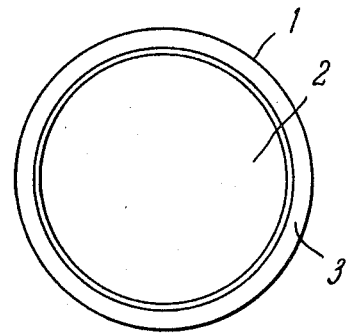

Now referring to FIG. 1 (a and b), the converter of the present invention comprises a ring 1 of piezoelectric material connected by its inner cylindrical surface with a disk-shaped resonating element 2. Applied on to the opposing plane surfaces of the ring 1 are electrodes 3 and 4 connected with an electric circuit (not shown in the drawing). The material of the ring 1 is polarized in this particular case in the axial direction. The ring 1 is disposed on the cylindrical surface of the resonating disk 2 asymmetrically with respect to the central transverse plane A—A of the latter.

When an emf is applied to the electrodes 3 and 4, radial vibrations arise in the ring 1. As the ring 1 is displaced with respect to the central transverse plane A—A of the resonating disk 2, flexural vibrations arise in the resonating element 2 under the influence of the radial vibrations in the ring 1, whereby the frequency of vibrations of the ring 1 is equal to, or near, the resonant frequency of the resonating element 2. By changing the outer radius of the ring 1 it can be tuned to the desired frequency.

When the present converter is used in an electromechanical filter, the disk-shaped resonating element 2 is, as a rule, an end resonator of the filter.

The input resistance $R_1$ of the converter at the place of connection of the piezoelectric ring 1 with the resonating disk 2 should be a definite value related to the load resistance $R_2$ of the filter as follows:

$$R_1 = R_2/n_2,$$

where $n$ is a transformation ratio.

Figure 2A:
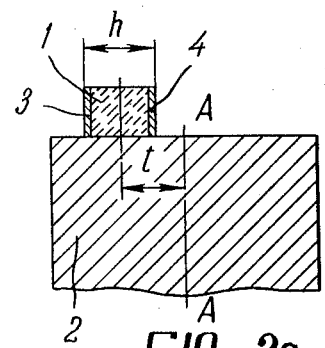
FIGS. 2a and 2b show two possible ways of positioning the piezoelectric ring asymmetrically relative to a disk-shaped resonating element, on one side of its central plane.
Figure 2B:
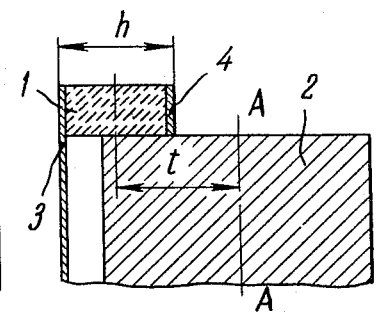

The transformation ratio $n$ is directly proportional to the distance $t$ (FIG. 2 a and b) from the central transverse plane of the ring 1 to the central transverse plane A—A of the resonating element 2, and the resistance $R_1$ is directly proportional to the thickness h of the ring 1.

By varying the values of $h$ and $t$, it is possible to obtain the converter construction which is optimal as to matching and size.

For instance, for a filter with the electrical parameters: $f_o = 500$ kcs, $2 \Delta F = 1$ kcs, $\Delta b = 3$db, $(F_f) - 3/-40 \leq 1.9$, the resonating elements of which are disks with a diameter of 8.5 mm and a thickness $h =$ of 1.87 mm, the ring-type tuned converter has the following size: the outer diameter 11.7 mm, the inner diameter 8.5 mm, the thickness 0.5 mm with $t = 0.52$ mm, where $f_o$ is the mid-frequency of the filter passband; $2 \Delta F$ is the width of the filter passband with the level $- 3$ db; $\Delta b$ is attenuation nonuniformity within the passband; $(F_f) -3/-40$ is the flatness factor, of the filter frequency characteristic with the levels $- 3$ db and $- 40$ db.

In this particular case the ring is made of piezoceramics polarized in the axial direction, and the resonating element is of "Elinvar" alloy.

If it is required to load the filter with a small input resistance, the values of $h$ and $t$ should be reduced. However, in case the ring 1 is disposed on one side of the central plane A—A of the resonating element 2, $t_{min} = h/2$. The range of variation of the thickness $h$ of the ring 1 is restricted on the lower limit side for construction reasons. Therefore, in actual fact, the range of the possible load resistances is also restricted from below in this case.

For instance, for the filter with the following electrical parameters: $f_o = 500$ kcs, $2 \Delta F = 5$ kcs, $\Delta b = 3$ db, $(F_f) = -3/-40 \leq 1.9$, the resonating elements of which are disks with a diameter of 8.5 mm, and a thickness of 1.87 mm, the thickness h of the ring 1 should be 0.12 mm with $t = 0.3$ mm. The outer diameter of the ring-shaped converter should be 11.7, and the inner diameter, 8.5 mm.

Figure 3:
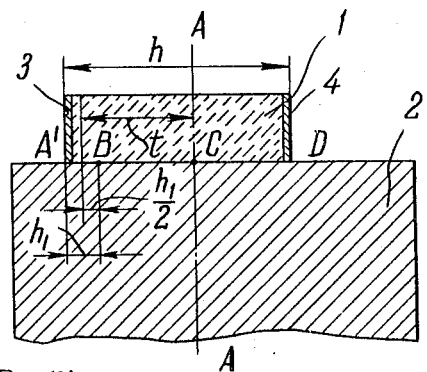
FIG. 3 shows a possible asymmetrical positioning of a piezoelectric ring relative to the central plane of a disk-shaped resonating element, wherein this plane traverses the piezoelectric ring.

With a view to obtaining small input resistance of the converter with a constructionally achievable thickness thereof, the ring 1 should be disposed asymmetrically on the cylindrical surface of the resonating element 2 so as to be traversed by the central plane A—A of the resonating disk 2 (FIG. 3).

In this case, when an alternating emf having its frequency near the natural resonant frequency of the flexural vibrations of the resonating disk 2 is applied to the electrodes 3 and 4, flexural vibrations arise in the resonating disk 2. Since with the appearance of flexural vibrations the cylindrical surface of the resonating disk starts turning about a point C, the action of two converter portions (BC and CD) which are equal in thickness will be balanced and the converter will operate as that described above, but having the thickness $h_1 = A'B = h - BD$ and mounted at a distance $t = (h - h_1)/2 + h_1/2 = h/2$ Thus, the equivalent thickness of the converter, and hence its input mechanical resistance can be sufficiently small values.

In actual fact, the lower limit value of the load resistance is restricted by the achievable accuracy of mounting the ring 1 on the cylindrical surface of the resonating element 2.

The ring-type converter for a filter, having the pass-band $2 \Delta F = 5$ kcs and the electrical parameters given above, has the outer diameter of 8.5 mm and the thickness $h = 0.54$ mm with $t = 0.3$ mm.

What is claimed is:

1. In an electromechanical diverter of flexual vibrations, of the type comprising a disc-shaped resonating element and an element for converting electrical impulses into mechanical vibrations, and mechanical vibrations into electrical impulses, the improvement comprising: a ring of piezoelectric material with electrodes applied on its opposing end surfaces to act for said converting element; a solid disc-shaped resonating element, characterized in that said ring of piezoelectric material is disposed on the external periphery of the cylindrical surface of the disc-shaped element so as to engage thereon asymmetrically with respect to a central plane which is transverse to the axis of the disc.

2. The electromechanical converter as in claim 1, in which said central plane traverses said ring.

* * * * *